United States Patent
Laing

(10) Patent No.: US 8,057,685 B2
(45) Date of Patent: Nov. 15, 2011

(54) SOLID SEPARATOR

(75) Inventor: David A. Laing, Elyria, OH (US)

(73) Assignees: James Benson, III, New York, NY (US); Clement C. Benson, New York, NY (US)

( * ) Notice: Subject to any disclaimer, the term of this patent is extended or adjusted under 35 U.S.C. 154(b) by 411 days.

(21) Appl. No.: 12/478,443

(22) Filed: Jun. 4, 2009

(65) Prior Publication Data

US 2009/0308818 A1 Dec. 17, 2009

Related U.S. Application Data

(60) Provisional application No. 61/060,652, filed on Jun. 11, 2008.

(51) Int. Cl.
*B01D 37/00* (2006.01)
*B01D 33/15* (2006.01)
*B01D 33/46* (2006.01)

(52) U.S. Cl. .......... 210/744; 210/780; 210/791; 210/97; 210/396

(58) Field of Classification Search .................. None
See application file for complete search history.

(56) References Cited

U.S. PATENT DOCUMENTS

| 31,371 | A | * | 2/1861 | Clark et al. | 209/351 |
|---|---|---|---|---|---|
| 135,952 | A | * | 2/1873 | Welch | 209/280 |
| 178,131 | A | * | 5/1876 | Ford | 209/351 |
| 401,363 | A | * | 4/1889 | Moresi | 127/21 |
| 442,213 | A | * | 12/1890 | Young | 366/149 |
| 474,930 | A | * | 5/1892 | Wheelan | 209/695 |
| 509,496 | A | * | 11/1893 | Stickney | 209/358 |
| 546,241 | A | * | 9/1895 | McNulty | 209/320 |
| 656,102 | A | * | 8/1900 | Fjeld | 209/266 |
| 701,687 | A | * | 6/1902 | Desaulles | 210/396 |
| 769,165 | A | * | 9/1904 | Jackson | 209/351 |
| 795,823 | A | * | 8/1905 | Darling | 209/49 |
| 820,560 | A | * | 5/1906 | Evans | 210/263 |
| 882,202 | A | * | 3/1908 | Hunt | 210/193 |
| 886,966 | A | * | 5/1908 | Findley | 209/351 |
| 891,654 | A | * | 6/1908 | Baenen | 210/396 |
| 931,280 | A | * | 8/1909 | Cunningham | 209/350 |

(Continued)

OTHER PUBLICATIONS http://www.gateway-supply.com/gems_005.htm, Gateway Supply Co., America's #1 Choice for Gems Optical Level Switches & Sensors, Jun. 16, 2009.

*Primary Examiner* — Robert James Popovics
(74) *Attorney, Agent, or Firm* — Cesar, Rivise, Bernstein, Cohen & Pokotilow, Ltd.

(57) ABSTRACT

A solid separator that uses a rotating screen, having spiral guides at its outer portion, over which a plurality of spiral-shaped scrapers are suspended. An inlet distributor including a plurality of apertures distributes a contaminated liquid flow over the screen, when rotated, permits the scrapers and guides to drive the deposited debris towards an outer edge of the screen and up a slight conical ramp and into a debris discharge sump. A level sensor may be included above the screen to activate the screen rotation based on the level of the contaminated liquid flow above the screen. An alternative embodiment uses individual scraper supports having respective jack mechanisms that permit the operator to independently lift and even rotate each scraper for additional cleaning or service. The alternative embodiment uses an assembly of two screens having an outer portion that also includes a slight conical ramp having spiral guides thereon.

39 Claims, 9 Drawing Sheets

U.S. PATENT DOCUMENTS

| | | | | |
|---|---|---|---|---|
| 990,251 A * | 4/1911 | Geiger | | 210/158 |
| 1,041,935 A * | 10/1912 | Worrall | | 209/271 |
| 1,173,671 A * | 2/1916 | McKinlay | | 209/274 |
| 1,717,313 A * | 6/1929 | Olier | | 210/499 |
| 1,940,138 A * | 12/1933 | McAdam | | 222/242 |
| 2,029,090 A * | 1/1936 | Yewell | | 209/444 |
| 2,042,308 A * | 5/1936 | Hardy | | 210/396 |
| 2,089,702 A * | 8/1937 | Lomax | | 210/408 |
| 2,127,360 A * | 8/1938 | Helle et al. | | 536/48 |
| 2,138,716 A * | 11/1938 | Truitt | | 241/273.2 |
| 2,222,664 A * | 11/1940 | Kunz et al. | | 210/199 |
| 2,289,934 A * | 7/1942 | Rapisarda | | 366/192 |
| 2,356,945 A * | 8/1944 | Pesznecker | | 209/627 |
| 2,540,517 A * | 2/1951 | Glasco | | 209/269 |
| 2,588,912 A * | 3/1952 | Denhard | | 210/396 |
| 2,604,995 A * | 7/1952 | Maslin | | 210/396 |
| 2,636,612 A * | 4/1953 | Cording, Jr. et al. | | 210/216 |
| 2,716,494 A * | 8/1955 | Hursh | | 210/396 |
| 2,798,612 A * | 7/1957 | Crumb | | 210/393 |
| 2,901,763 A * | 9/1959 | Jalkanen | | 15/246.5 |
| 2,910,184 A * | 10/1959 | Strich | | 210/371 |
| 3,047,151 A * | 7/1962 | Hurst | | 209/366.5 |
| 3,080,063 A * | 3/1963 | Engwall et al. | | 210/330 |
| 3,104,069 A * | 9/1963 | Ferguson | | 241/83 |
| 3,123,551 A * | 3/1964 | Walker | | 209/29 |
| 3,217,561 A * | 11/1965 | Allgaier et al. | | 74/600 |
| 3,262,574 A * | 7/1966 | Parmentier | | 210/393 |
| 3,319,789 A * | 5/1967 | Brown et al. | | 210/771 |
| 3,349,904 A * | 10/1967 | Theiler et al. | | 209/29 |
| 3,361,262 A * | 1/1968 | Orr et al. | | 210/330 |
| 3,407,935 A * | 10/1968 | Burton | | 210/151 |
| 3,416,668 A * | 12/1968 | Lobley | | 210/203 |
| 3,438,503 A * | 4/1969 | Carpenter | | 210/396 |
| 3,469,703 A * | 9/1969 | Parmentier | | 210/393 |
| 3,478,885 A * | 11/1969 | Jackson | | 210/194 |
| 3,485,375 A * | 12/1969 | Graham | | 210/330 |
| 3,568,844 A * | 3/1971 | Coffelt et al. | | 210/327 |
| 3,587,862 A * | 6/1971 | Lee | | 210/330 |
| 3,827,567 A * | 8/1974 | Rundqvist | | 210/414 |
| 3,836,464 A * | 9/1974 | Brookins et al. | | 210/413 |
| 3,863,815 A * | 2/1975 | Chaffee et al. | | 222/238 |
| 3,932,442 A * | 1/1976 | Salmon et al. | | 209/309 |
| 3,942,771 A * | 3/1976 | Knutsen | | 366/309 |
| 3,957,636 A * | 5/1976 | Arvanitakis | | 210/739 |
| 4,271,682 A * | 6/1981 | Seki | | 62/354 |
| 4,303,522 A * | 12/1981 | Ducasse | | 210/297 |
| 4,308,135 A * | 12/1981 | Armstrong et al. | | 209/240 |
| 4,524,550 A * | 6/1985 | Burke et al. | | 451/87 |
| 4,540,485 A * | 9/1985 | Lanerie | | 209/323 |
| 4,635,408 A * | 1/1987 | Burke et al. | | 451/60 |
| 5,047,123 A * | 9/1991 | Arvanitakis | | 202/170 |
| 5,356,541 A * | 10/1994 | Wickzell | | 210/791 |
| 5,635,066 A * | 6/1997 | Maurer | | 210/411 |
| 5,975,311 A * | 11/1999 | Jackson | | 210/393 |
| 7,473,375 B2 * | 1/2009 | Stoerzer | | 210/791 |
| 7,736,526 B2 * | 6/2010 | Smith et al. | | 210/780 |
| 2008/0173594 A1 * | 7/2008 | Stoerzer | | 210/791 |
| 2009/0020469 A1 * | 1/2009 | Pitre | | 210/232 |
| 2009/0308818 A1 * | 12/2009 | Laing | | 210/744 |
| 2010/0084351 A1 * | 4/2010 | Smith et al. | | 210/780 |

* cited by examiner

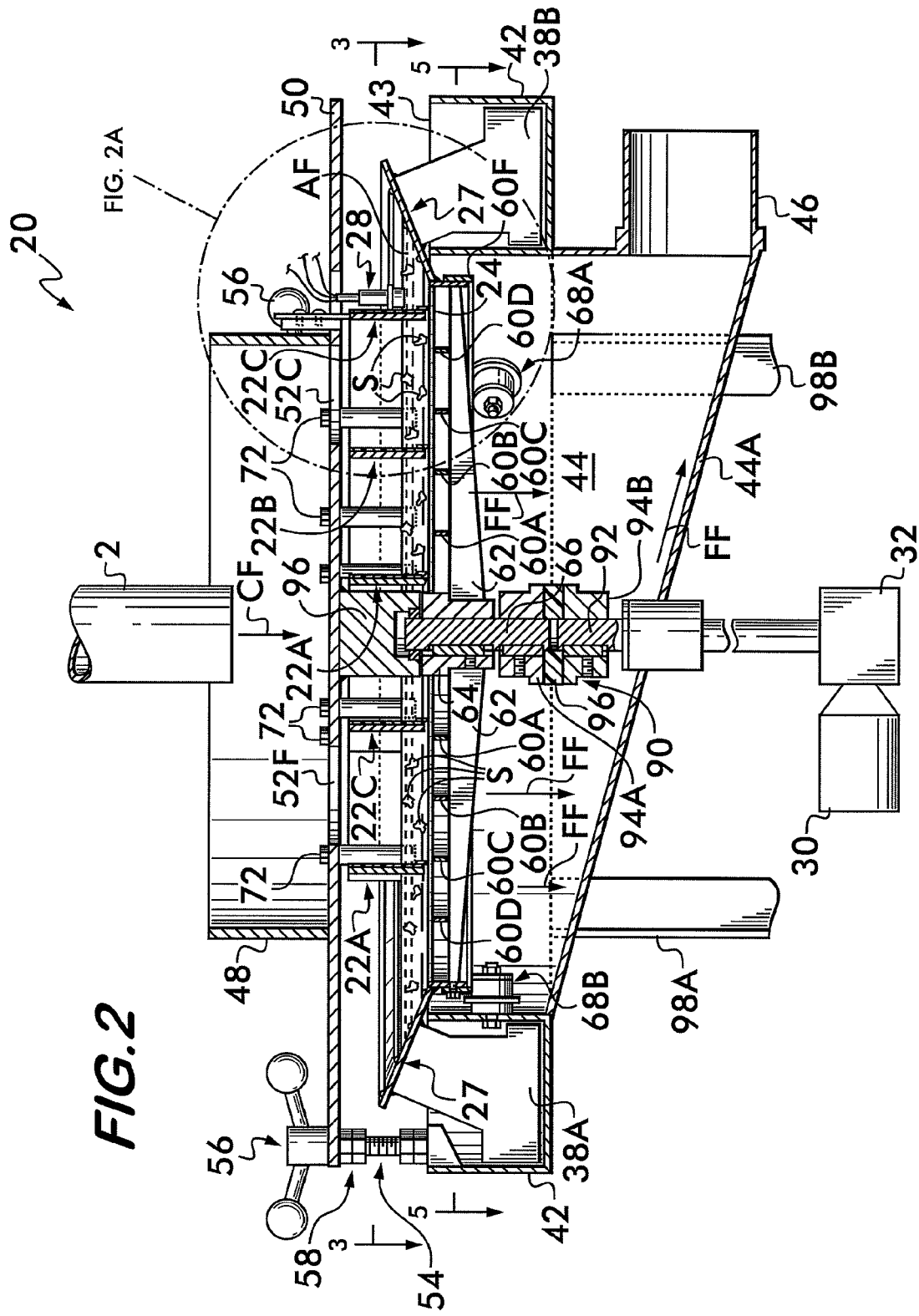

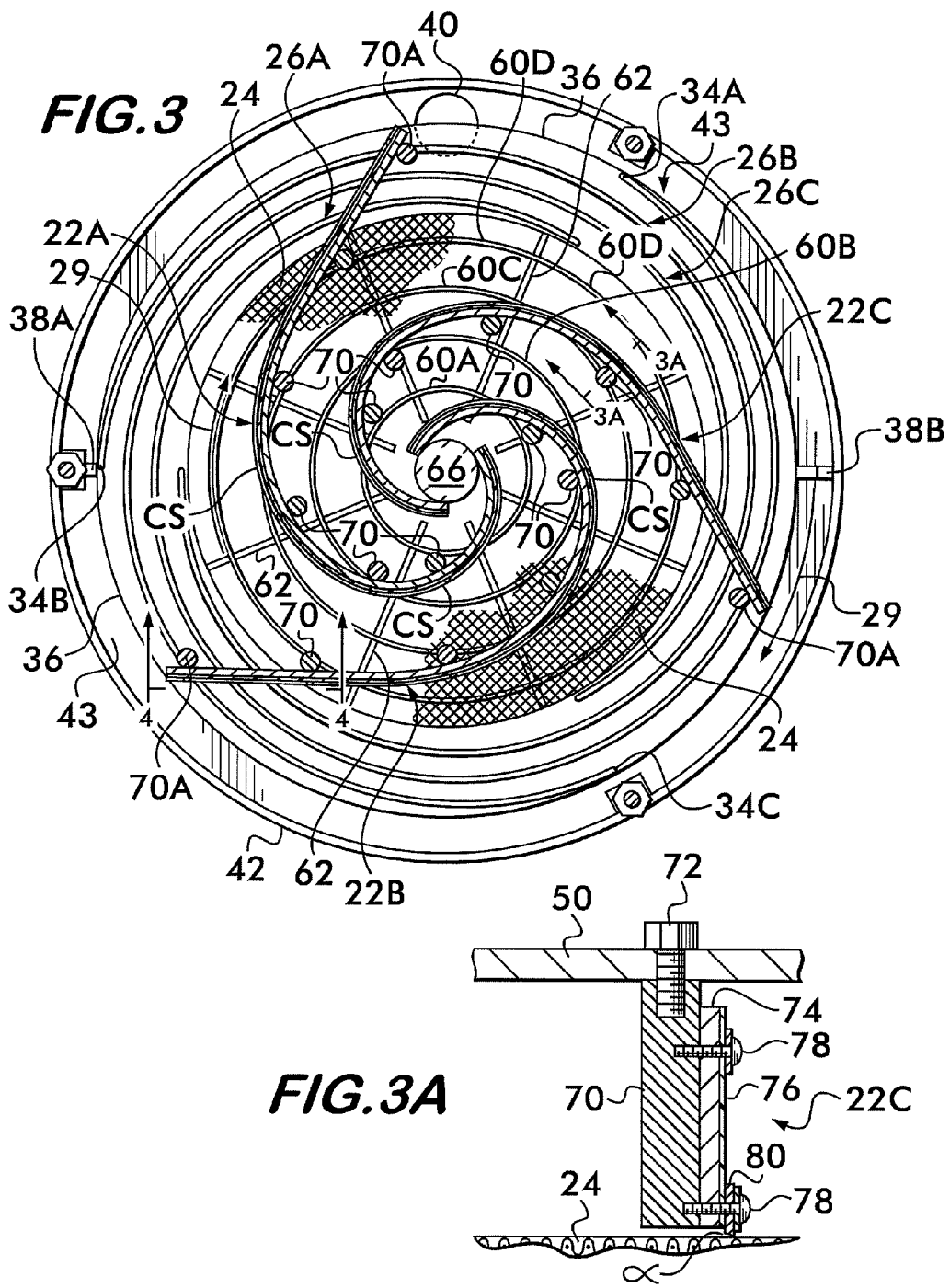

US 8,057,685 B2

SOLID SEPARATOR

CROSS-REFERENCE TO RELATED APPLICATIONS

This non-provisional application claims the benefit under 35 U.S.C. §119(e) of Provisional Application Ser. No. 61/060,652 filed on Jun. 11, 2008 entitled SOLID SEPARATOR and whose entire disclosure is incorporated by reference herein.

BACKGROUND OF THE INVENTION

1. Field of Invention

This invention relates generally to filter devices and, more particularly, to filters for separating solid material from liquid flows.

2. Description of Related Art

In some industries, e.g., the food processing industry, it is necessary to remove relatively large solid materials attached to food products using a liquid flow (e.g., water) while minimizing the loss of the liquid during the filtering process and while maintaining liquid conditions (e.g., maintaining the temperature of the liquid flow). In many situations, the filtering processes are established in remote locations where the need to recycle the liquid flow is critical. Thus, the loss of such liquid flow must be minimized during filtering.

Thus, there remains a need for filtering such solid materials from a liquid flow while minimizing the loss of such liquid during the filtering process and while maintaining liquid conditions.

All references cited herein are incorporated herein by reference in their entireties.

BRIEF SUMMARY OF THE INVENTION

An apparatus for separating debris from a liquid flow is disclosed. The apparatus comprises:: a screen for removing debris from a liquid flow which deposits the debris on a top surface of the screen to form a filtered liquid flow; a motor/gear assembly for rotating the screen about a vertical axis; a plurality of scrapers (e.g., spiral-shaped scrapers) suspended closely adjacent the top surface of the screen for displacing the debris deposited on the top surface and toward an outer edge of the screen when the screen is rotated; a debris discharge sump positioned adjacent the outer edge of the screen for receiving the displaced debris; and an outlet for receiving the filtered liquid flow for recycling the filtered liquid flow.

A method for separating debris from a contaminated liquid flow containing debris while minimizing the loss of such liquid during separation is disclosed. The method comprises: directing the contaminated flow onto a horizontally-positioned screen; suspending a plurality of scrapers (e.g., spiral-shaped scrapers) closely-adjacent a top surface of the screen; rotating the screen about a vertical axis to permit the plurality of scrapers to displace the debris deposited on the screen and to form a filtered liquid flow that passes through the screen into a outlet for recycling the filtered liquid flow; and collecting the displaced debris into a debris discharge plenum positioned along an outer edge of said screen.

BRIEF DESCRIPTION OF SEVERAL VIEWS OF THE DRAWINGS

The invention will be described in conjunction with the following drawings in which like reference numerals designate like elements and wherein:

FIG. 2 is a partial cross-sectional side view of the first embodiment of the solid separator;

FIG. 3 is a partial cross-sectional view taken along line 3-3 of FIG. 2 showing the spiral scrapers and the spiral cleats;

FIG. 3A is a cross-sectional view of the scraper and scraper support taken along line 3A-3A;

DETAILED DESCRIPTION OF THE INVENTION

Figure 1:
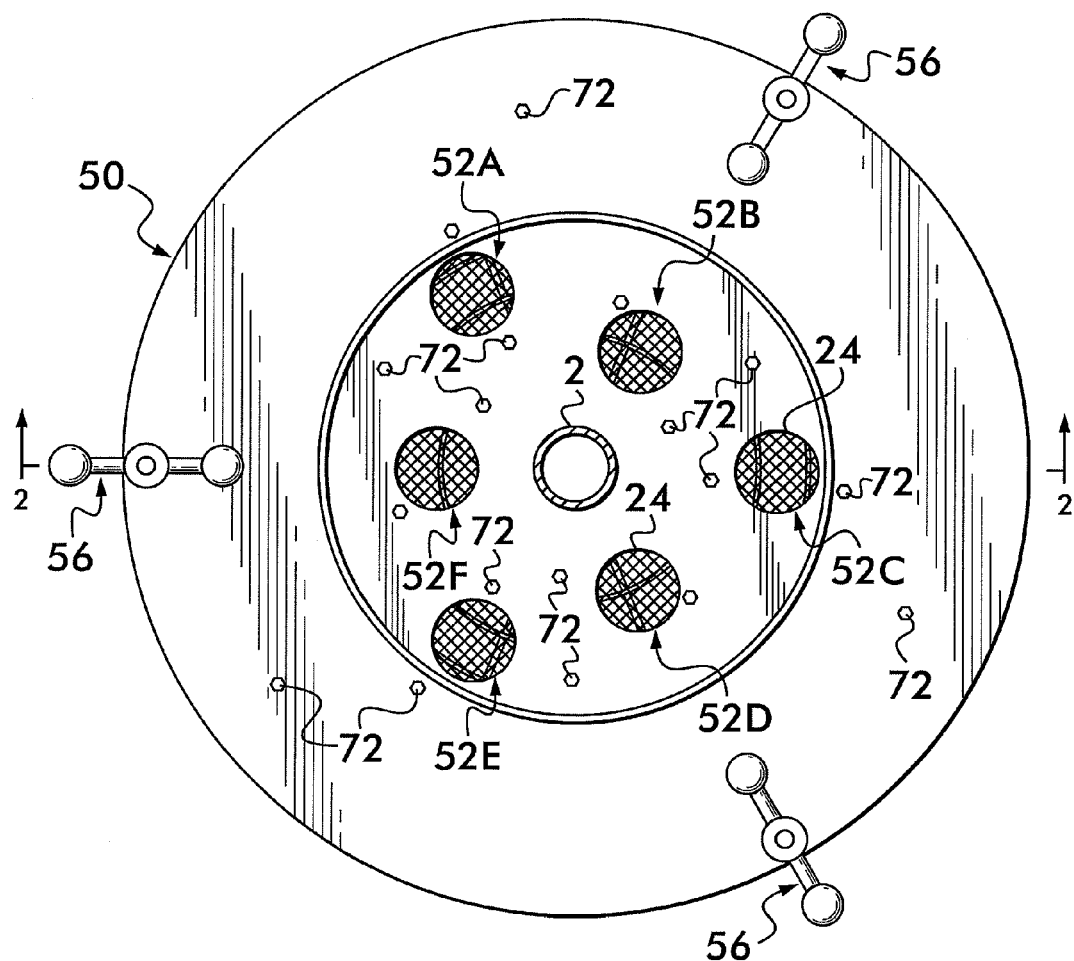
FIG. 1 is a top plan view of a first embodiment of the solid separator of the present invention.
Figure 2A:
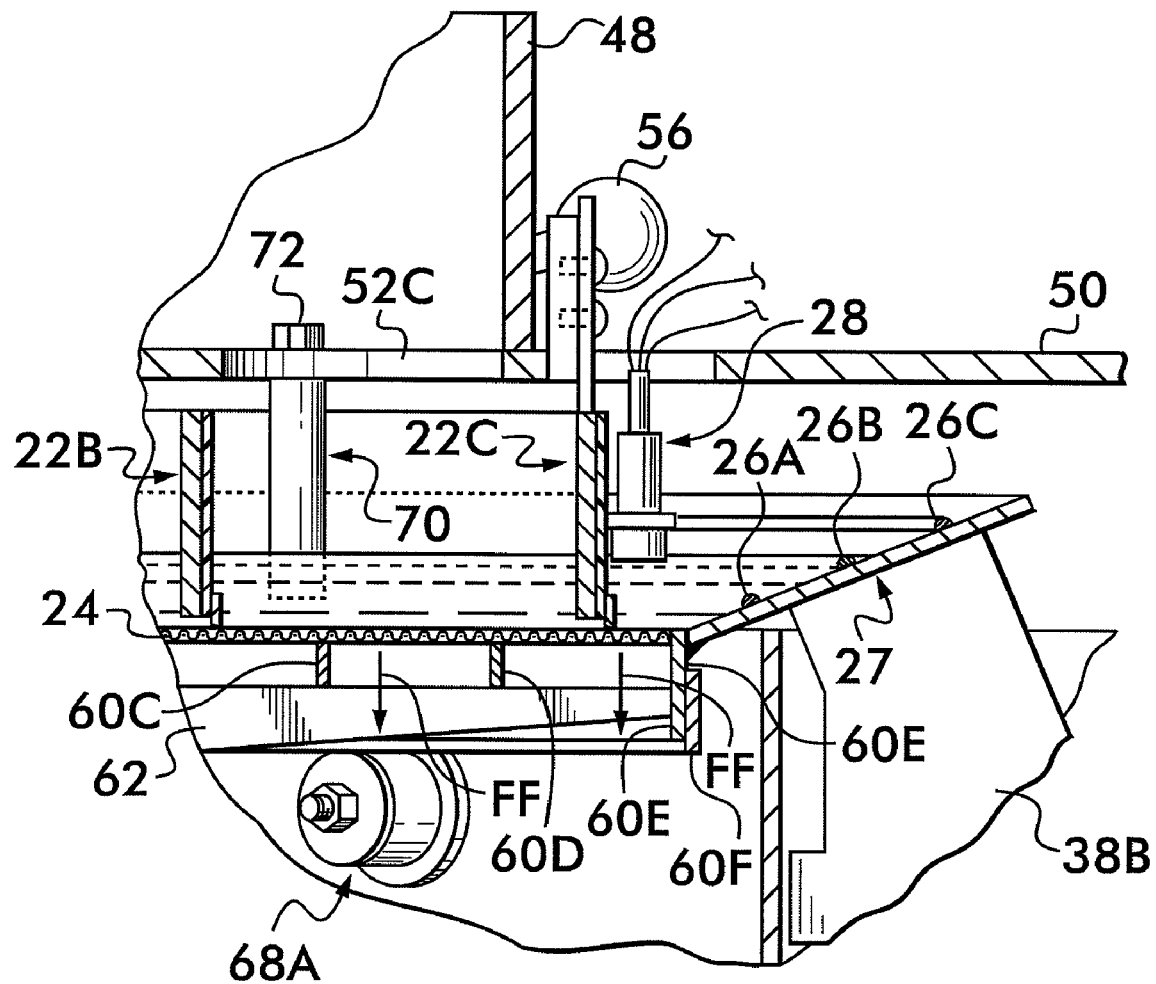
FIG. 2A is an enlarged partial cross-sectional view of the region 2A shown in FIG. 2.
Figure 4:
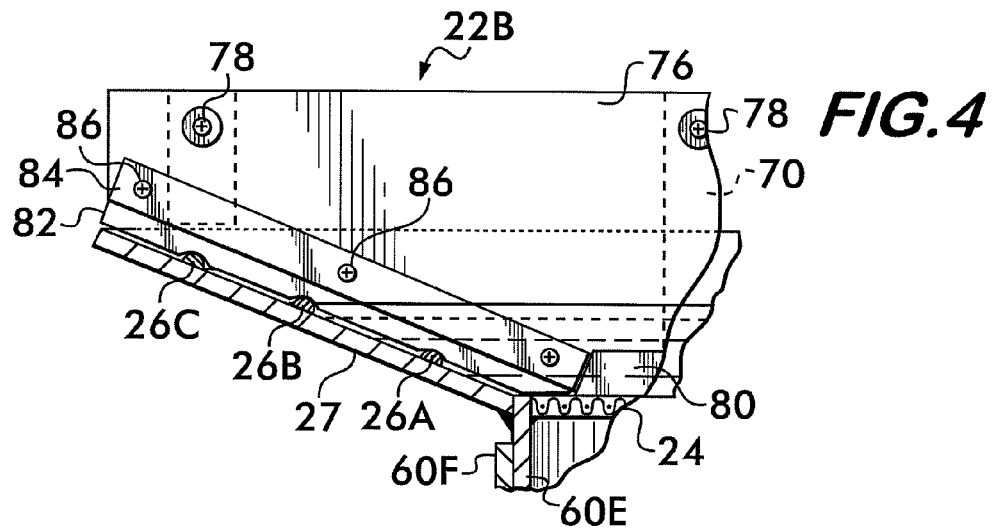
FIG. 4 is a partial cross-sectional view of the outer end of one of the spiral scrapers taken along line 4-4 of FIG. 3.

The solid separator of the present invention permits the filtering of a high volume of solids in a contaminated flow, while permitting the separator to be automatically cleaned when necessary. The solid separator achieves this through the use of stationary spiral-shaped scrapers in cooperation with spiral-shaped guides or cleats that guide the separated solids on a rotating surface towards a discharge chamber while permitting the filtered flow to be directed or recycled elsewhere.

The present application provides two embodiments of the solid separator by way of example only, it being understood that other configurations of the solid separator are within the scope of the present invention and are not limited to what is particularly shown in the figures.

FIGS. 1-5 are directed to the first embodiment and FIGS. 6-9 are directed to the second embodiment. Although there are differences in the components of the two embodiments, the main distinction between the two embodiments is that where removal of a scraper support plate in the first embodiment is required, a crane is typically required to lift it due to its substantial weight (e.g., 150-160 pounds). Where a crane is not available, the second embodiment replaces the scraper support plate with respective scraper supports that can be individually lifted and pivoted out of the way using respective jack mechanisms.

The present invention removes solid material from a flowing liquid (e.g., water, but the type of liquid does not form any limitation on the present invention) with a three or four percent (by way of example only) debris content by volume. Although these devices may handle flows of up to approximately 400 gpm, larger versions of the present invention can handle even higher flows. One exemplary application of the present invention is for food processing (e.g., rinsing produce, e.g., carrots). In those types of food applications, stainless steel is the preferred material for the solid separator, although for other non-food applications, other materials can be used in the solid separator. By way of example also, the solid separator disclosed in the present invention receives a contaminated flow from an overhead inlet with a filtered flow emerging from a bottom location and therefore does not utilize a pressurized vessel; however, it is within the broadest scope of the present invention to include a pressurized solid separator configuration.

It should be noted that where the term "screen" is used, as in screen 24, screen 124A and screen 124B, although the figures give the appearance that one can see through the screen perforations to underlying structure, in actuality, the perforations are so small that such views are obstructed. For compliance with PTO drafting rules, the size of the screen perforations are greatly exaggerated.

First Embodiment

The solid separator 20 basically comprises a plurality (e.g., three) of spiral-shaped scrapers 22A, 22B and 22C which are closely-suspended over a screen 24 secured within a screen carrier 60 which includes a plurality (e.g., three) of concentrically-located spiral-shaped guides or cleats 26A, 26B and 26C located on an outer extension 27 of the carrier 60, as shown most clearly in FIG. 3. It should be noted that the portion 27 (see FIG. 2) of the carrier 60 which contains the cleats 26A-26C is angled upward (see FIG. 2). This inclined portion 27 permits the screen 24 (e.g., 26 or 28 gauge thickness and, by way of example only, ⅟16 in., or ⅟32 in. or 0.020 in. diameter perforations) to act as a bowl or container for the deposited contaminated flow CF. Cleaning of the screen 24 is accomplished by rotating the screen 24 under the closely-suspended spiral scrapers 22A-22C in cooperation with the spiral-shaped cleats 26A-26C. As will be discussed in detail later, the phrase "rotating the screen" involves rotating the screen 24, as well as the outer extension 27 since they both are secured to the screen carrier 60. This rotation of the screen 24 via a motor 30 and driver reducer 32 (which rotate the screen 24 in the direction of the arrow 29; see FIG. 3) can either be continuous or intermittent. In the continuous mode, the screen 24 is wiped every 4.57 seconds, by way of example only. In the intermittent mode, a fluid level sensor 28 is used. In particular, as contaminated flow CF containing the solids S is deposited on the screen 24, the fluid level sensor 28 senses the accumulated flow AF. When a certain level of accumulation is reached, the sensor 28 activates the motor 30 and driver reducer 32 which rotate the screen 24 in the direction of the arrow 29 (see FIG. 3). As the screen 24 rotates, the solids S are diverted along the concave sides CS of each of the scrapers spiral 22A-22C and upward, along the cleats 26A-26C on the outer portion 27 of the screen 24. The solids S are then driven along the cleats 26A-26C by the rotation of the screen 24 and via contact with the convex sides CS of the scrapers 26A-26C and eventually make their way to any end 34A, 34B and 34C of the cleats 26A-26C. At those points, the solids are driven further upward and toward the outer edge 36 of the screen 24 where they eventually pass over that edge 36 and fall through an annular debris plenum or sump 42 (see FIG. 2) which is open at the top 43 (FIG. 2). A plurality of paddles (e.g., two) 38A and 38B (FIG. 2) are fixed, on opposite sides, to the underside of the screen 24 and positioned within the debris plenum 42. So as the screen 24 rotates, the paddles 38A and 38B drive the deposited solid debris through the debris plenum 42 and towards a discharge port or outlet 40.

A filtered flow FF emerges from underneath the screen 24 and passes into a collection chamber 44 (FIG. 2) having a slanted lower surface 44A that diverts the filtered flow FF toward a collection or recycle port 46 (e.g., a 6 inch, ANSI Class 150 outlet).

The solid separator 20 will now be discussed in more detail.

As shown in FIG. 2, the contaminated flow CF (e.g., solids or debris dispersed in a liquid such as, but not limited to, water) enters the separator 20 from an overhead inlet 2 (e.g., a 6 inch inlet, which may also comprise two, three or more inlet pipes) and is confined within a cylindrical container 48 which rests upon an inlet distributor and scraper support 50 (hereinafter, the "scraper support"). The scraper support 50 comprises a flat, circular plate (e.g., 54.50 inches diameter) which includes a plurality of apertures or holes 52A, 52B, 52C, 52D, 52E and 52F (the number of holes is by way of example only and is not limited to that number) which distribute the contaminated flow CF within the container 48. The scraper support 50 is supported by three (by way of example only) vertically-oriented threaded rods (one of which, 54, can be seen in FIG. 2) and each of which has an associated speed handle 56. The height of the scraper support 50 is adjustable by a pair of nuts 58.

The contaminated flow CF passes through the holes 52A-52F in the scraper support 50 and onto the round perforated metal screen 24 (e.g., 35½ in. diameter), such as 26 or 28 gauge thickness and having diameter perforations of ⅟16, ⅟32 or 0.020 inch diameters, by way of example only. The screen 24 is fixedly secured (e.g., tack welded) to concentric support rings 60A, 60B, 60C and 60D of the screen carrier 60 (see FIGS. 2, 2A and 3) which includes support ribs 62. The carrier 60 comprises a collar 64 that slips over an upper drive shaft 66 ultimately coupled to the motor 30 and driver reducer 32. The inclined portion 27 is fixedly secured (e.g., welded) to an inner surface 60E of the carrier 60, as shown most clearly in FIG. 2A. The outer edge 60F of the carrier 60 rests on a plurality of rollers (e.g., three) 68A, 68B and 68C for facilitating rotation.

The three scrapers 22A-22C are suspended from the scraper support 50 and are arranged so that they are ⅓ of a revolution (120°) apart, as can be most clearly seen in FIG. 3. Each scraper is coupled to the support 50 using a plurality of posts 70 (e.g., six) which are themselves secured to the support 50 via threaded members 72 (e.g., 0.50 inch bolts). As shown most clearly in FIG. 3A, each scraper (e.g., 0.25 inches thick) comprises a scraper body 74 which is secured to the post 70 by threaded members 78. Upon the convex or face side CS of each scraper body 74 is secured a Teflon® material 76 (e.g., a Teflon® tape having an adhesive). The Teflon® material 76 minimizes the solids or debris sticking or clinging to the scrapers 22A-22C and facilitates having the solids or debris slide sideways along the scrapers. As can also be seen in FIG. 3A, the lower end of each scraper includes a clamp 80 secured by one of the threaded members 78 to the scraper body 74. The clamp 80 prevents the lower edge of the Teflon® material 76 from separating from the scraper body 74 during screen 24 rotation. It should also be noted that the lower end of the clamp 80 is tapered, forming an angle a (e.g., 15°) with the screen plate 24 to increase scraping efficiency.

As mentioned previously, the scrapers 22A-22C operate in cooperation with the cleats 26A-26C to move the solids or debris over the edge of the screen 24 and into the debris plenum 42. To accomplish this, the outer end of each scraper is tapered (see FIG. 4) upward to conform to the incline of the screen portion 27. The outermost post 70A is shorter than the other remaining scraper posts 70 in order to avoid interference with the inclined portion 27. Coupled to the tapered edge of the scraper is a pliable wiper 82 (e.g., rubber) which is secured to the scraper 22C by a clamp bar 84 (e.g., metal) via a plurality of threaded members 86. As the screen 24 rotates, the solids/debris are pushed to the outside of the screen 24 by the spiral scrapers 22A-22C, towards the inclined portion 27. The pliable wiper 82 directs the solids/debris along the moving cleats 26A-26C, thereby moving the solids/debris up the inclined portion 27 along the spiral cleats 26A-26C and eventually over the edge 36 of the screen 24 and into the open top 43 of the annular debris plenum 42 and eventually through the discharge port 40 in the bottom of the plenum 42.

As shown most clearly in FIG. 2, the upper drive shaft 66 has a lower end that is positioned within a coupling 90 that includes a lower drive shaft 92. The coupling 90 comprises an upper housing 94A and a lower housing 94B (e.g., steel) in between which is disposed a pliable material (e.g., rubber) 96. This "split shaft" design permits the coupling of the screen 24/carrier 60 assembly to the motor 30 and driver reducer 32 with some "play", thus alleviating the need for perfect alignment. A hub 96 portion that fits onto the top of the upper drive shaft 66 may be welded to the scraper support 50.

The motor 30, by way of example only, may comprise a 1 hp, 1750 rpm motor and the driver reducer 32 may comprise, by way of example only, a 4×2⅝ inch double worm reducer (400:1).

As mentioned previously, where cleaning is accomplished intermittently, a fluid level sensor 28 is used. By way of example only, a refractive level sensor (e.g., an optical level sensor such as the GEMS ELSE 100 Level Switch) uses light refraction characteristics of air and water to determine whether the sensor is above the contaminated flow CF or slightly submerged. If the sensor 28 detects slight submersion, the motor 30 and driver reducer 32 are activated to rotate the screen 24. Other types of liquid level sensing are within the scope of the present invention.

Figure 5:
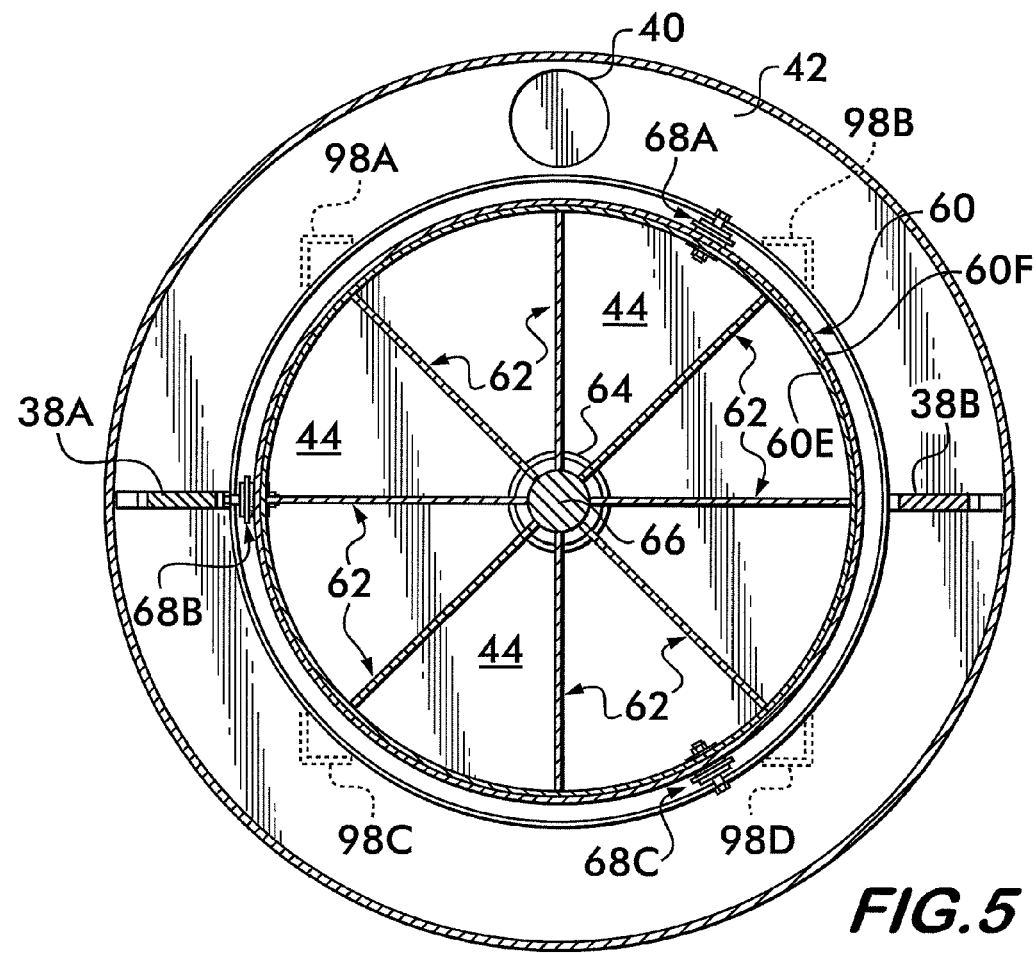
FIG. 5 is a cross-sectional view plan view taken along line 5-5 of FIG. 2 showing the support ribs of the rotating screen carrier.

Support legs 98A-98D for the solid separator 20 are shown most clearly in FIG. 5.

For more thorough cleaning, the solid separator 20 can be steam cleaned and disinfected. This is accomplished by removing the scraper support 50 using a crane (not shown). To release the scraper support 50, the speed handles 56 are removed. The screen 24 and its carrier 60 can then also be removed with the crane.

Second Embodiment

As mentioned previously, where a crane is not available, another version of the solid separator provides a more efficient way for scraper/screen disassembly, where necessary. It should be understood that the structure of the scraper itself, as well as the debris plenum 42 and motor 30/driver reducer 32 and shaft assembly is similar to the first embodiment 20 and therefore that discussion is not repeated here.

Figure 6:
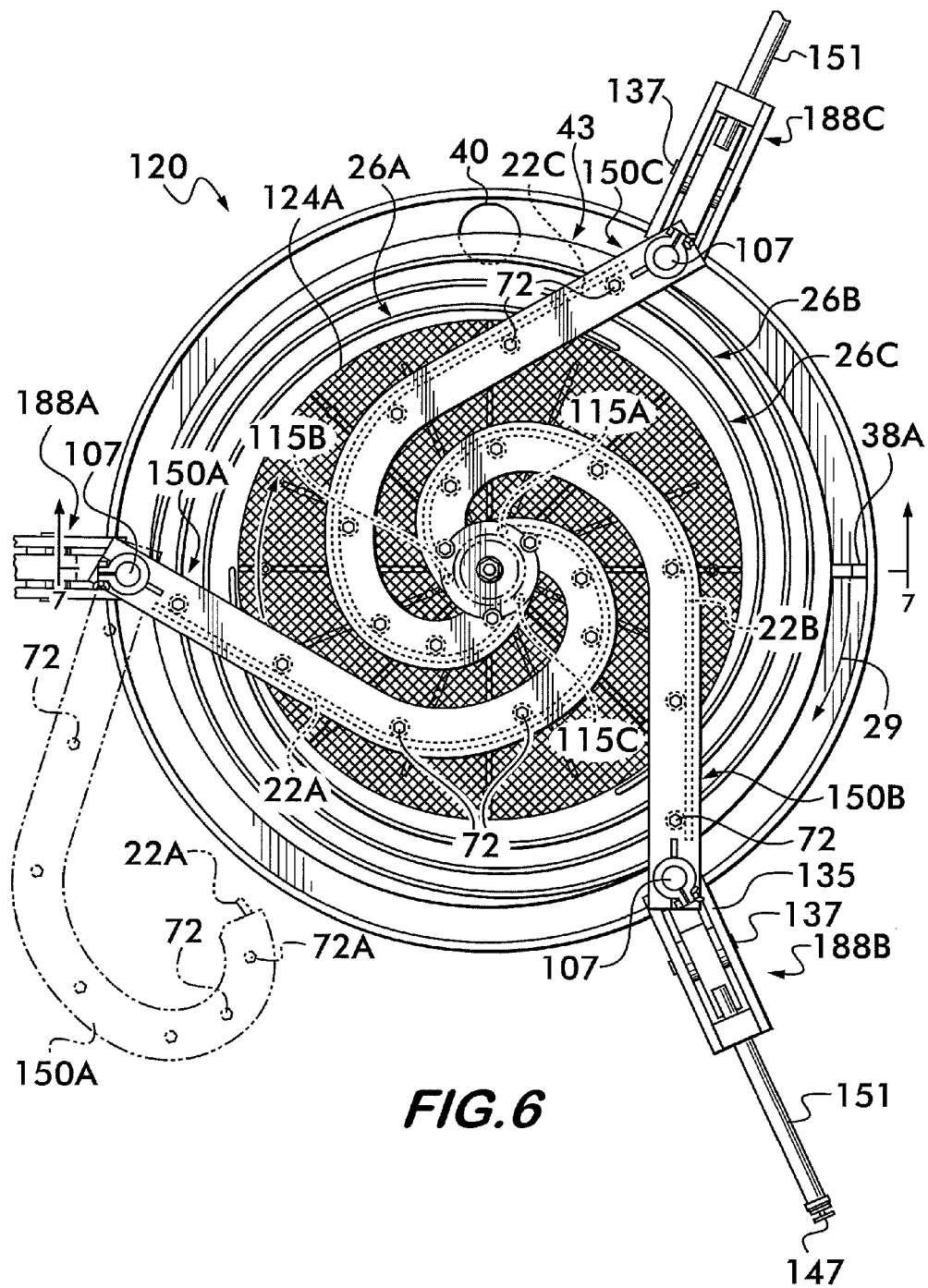
FIG. 6 is top plan view of a second embodiment of the solid separator which uses individual scraper supports that are also spiral-shaped and which can be individually released from the center, raised and then pivoted about their outer ends away from the center.
Figure 7:
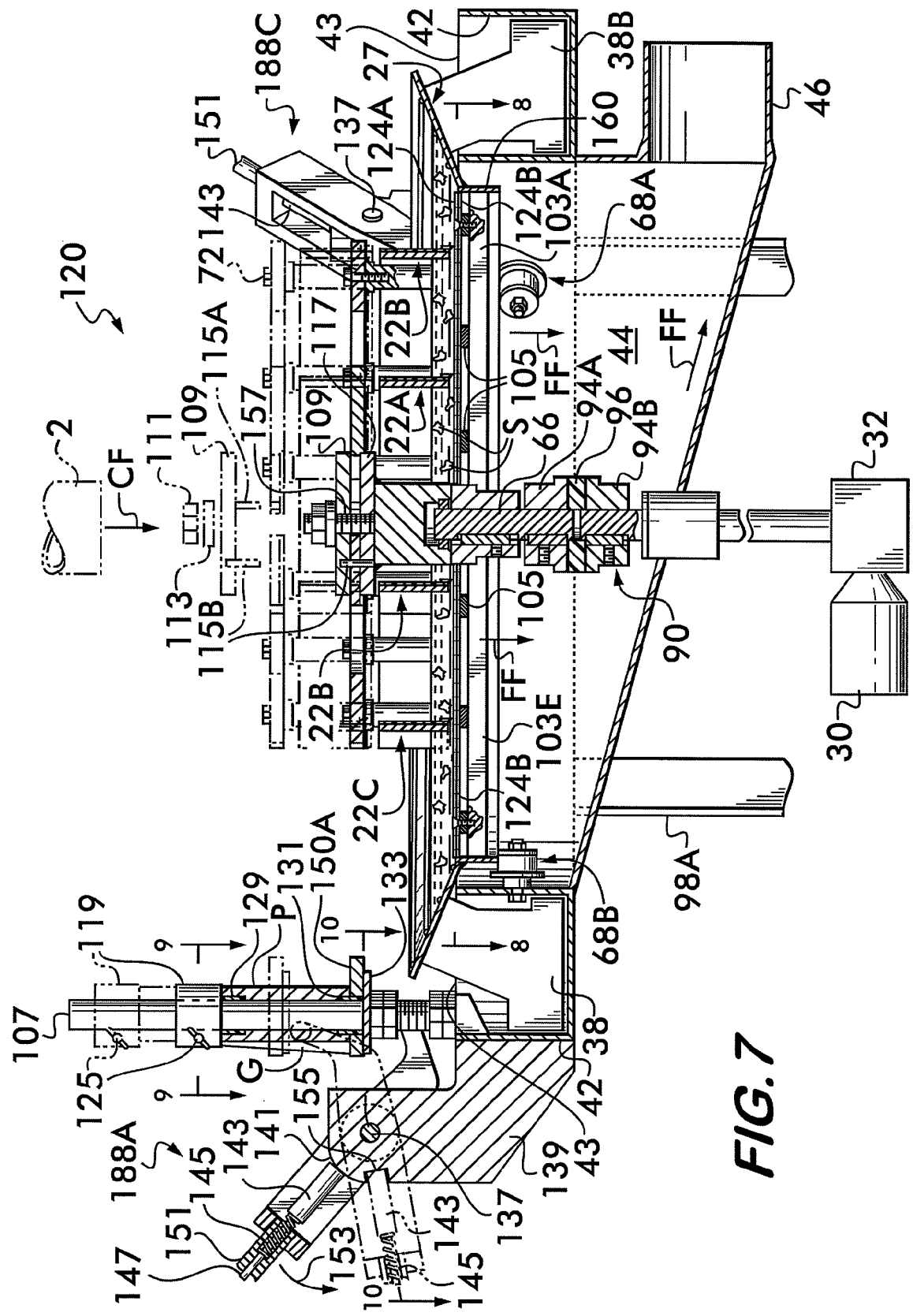
FIG. 7 is a partial cross-sectional side view of the second embodiment of the solid separator taken along line 7-7 of FIG. 6.
Figure 8:
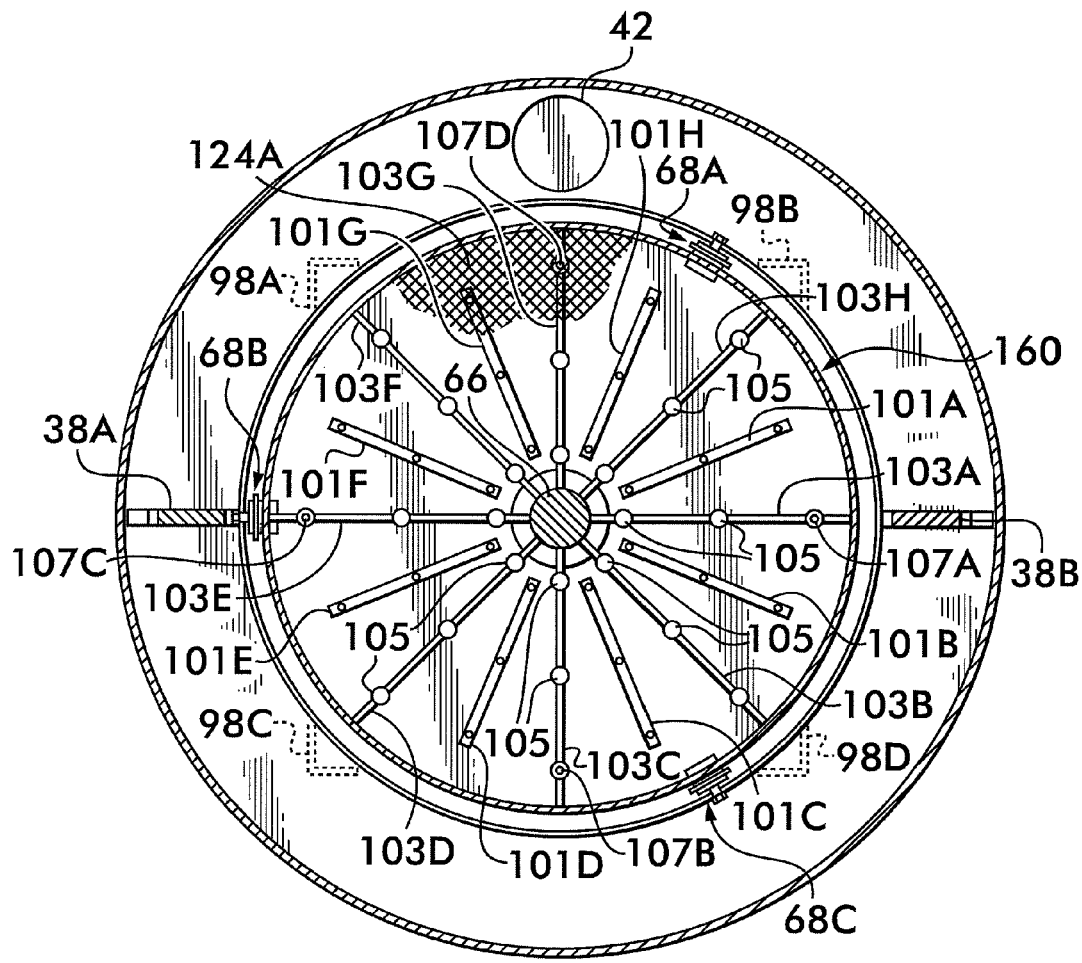
FIG. 8 is a top cross-sectional view of the second embodiment of the solid separator taken along line 8-8 of FIG. 7.
Figure 9:
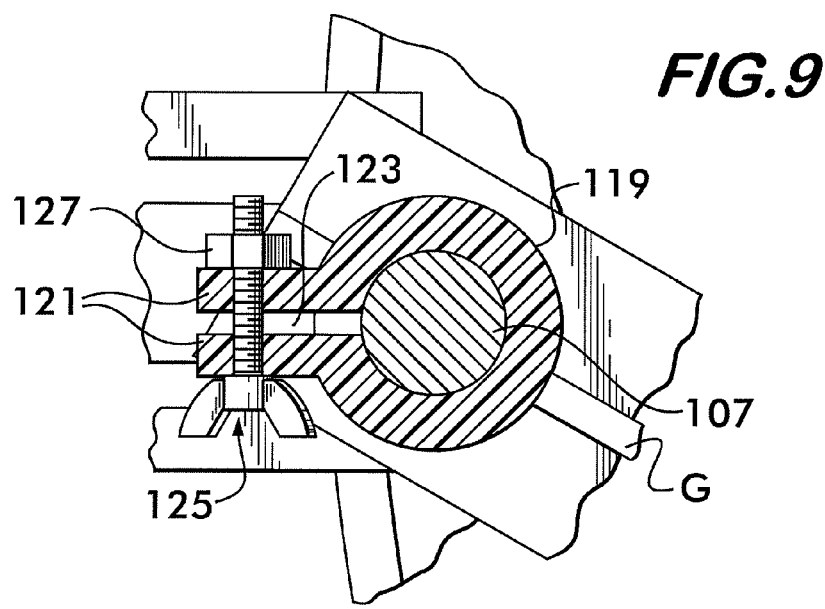
FIG. 9 is a partial cross-sectional top view of a collet used for securing its respective scraper in a raised or lowered position and taken along line 9-9 of FIG. 7.

As shown in FIGS. 6-7, the second embodiment 120 of the solid separator eliminates the cylindrical container 48 as well as the shared scraper support 50. Instead, individual scraper supports, 150A, 150B and 150C (e.g., ¾ inch×½ inch) are used to support their respective spiral-shaped scrapers 22A, 22B and 22C. Respective leverage-lift or jack mechanisms 188A, 188B and 188C can be used to independently raise and pivot the respective scrapers 22A, 22B and 22C, as will be described in detail later. In addition, the round perforated metal screen 24 having the outer inclined portion 27 of the first embodiment 20 is replaced, in the second embodiment 120, with an assembly of two pieces of pre-machined perforated metal elements 124A and 124B (FIG. 7, and hereinafter referred to as "metal layers"), both of which can be lifted out of a carrier 160 (FIG. 8). The upper perforated metal layer 124A may comprise a 26 or 28 gauge thickness (e.g., ¹⁄₁₆ in., or ¹⁄₃₂ in. or 0.020 in. diameter perforations) while the lower perforated metal layer 124B may comprise 14 gauge thickness (e.g., ¼ in. diameter perforations). Because of the relative thin composition of these two layers, it is desirable to provide handling members to which the layers 124A/124B are directly coupled. Thus, if it becomes necessary to remove the layers 124A/124B from the carrier 160 for more specialized cleaning, the operator can seize the handling members to manipulate the layers 124A/124B as an assembly. These radially-oriented handling bars 101A-101H are shown in FIG. 8 and may be coupled to the screens using three threaded members. The layers 124A/124B are secured to the carrier 160 using radial carrier support members 103A-103H as also shown in FIG. 8. Support pads 105 are distributed on top of the radial carrier support members 103A-103H and four threaded members 107A-107D are used to releasably secure the layers 124A/124B to the support carrier 160. As in the first embodiment 20, the support carrier 160 rides on rollers 68A-68C when the carrier 160 is rotated by the motor 30/driver reducer 32. Also, in the second embodiment 120, the inclined portion 27, including the guides or cleats 26A-26C, form the outer edge of the support carrier 160, as shown in FIG. 6.

As can most clearly be seen in FIG. 6, the curved ends of the scrapers 22A-22C/scraper supports 150A-150C meet at the center of the solid separator 120 and are releasably secured to a cover plate 109 (e.g., 7.5 in. diameter) by a nut 111 and a washer 113 (see FIG. 7 also) engaged with a threaded member 157. In particular, alignment pins 115A, 115B and 115C are fixedly secured within the cover plate 109 and pass through respective scraper supports 150A, 150B and 150C and then into a second or lock plate 117 that is welded to the hub 96. The cover plate 109 comprises three recesses in its periphery into which pass three scraper post threaded members 72A, 72B and 72C (see FIG. 6). These three members act as alignment posts for the three corresponding recesses in the cover plate 109 periphery when the curved ends of the scrapers 22A-22C are being positioned at the center of the solid separator 120; however, the threaded members 72A-72C do not secure the cover plate 109 to the second plate 117.

As mentioned previously, each scraper 22A-22C in the second embodiment 120 can be independently lifted upward and then pivoted should it become necessary to clean or service the scraper or to remove the layers 124A/124B; each scraper and respective scraper support weigh approximately 60 pounds. In order to lift and pivot the scrapers 22A-22C, the following procedure is followed. First, the nut 111, washer 113 and cover plate 109 are removed, as shown in phantom in FIG. 7. Each end of the scraper supports 150A-150C is supported by a non-rotating post 107 (FIG. 6) located at the outer edge of the solid separator 120; these positions correspond to the positions where the speed handles 56 of the first embodiment 20 are located. Fixedly secured (e.g., welded) to the outer end of each scraper support 150A-150C is an elongated projection (e.g., 7 inches by 3 inch (OD), only one of which, P, is shown in FIG. 7 and having a gusset G) that slides over the post 107. Positioned on top of the projection P is a clamp 119 which includes extensions 121 (FIG. 9) that surround a slit 123 in the clamp 119 which permits the clamp 119 to clamp against the rod 107 and prevent upward movement of the scraper support 150A during screen rotation. A threaded member 125 and nut 127 (e.g., a wing screw, although this is shown simply by way of example and that this may be accomplished by an entire host of other threaded members) provide the releasable securement of the clamp 119 to the post 107. To facilitate movement of the projection P/clamp 119 up and down the rod 107, two sleeves 129 and 131 of a Teflon® material are provided on the inner diameter of the projection P at upper and lower locations. The outer end of the scraper support 150A (as for the other two scraper supports 150B and 150C) rests upon a load-distributing member 133 (e.g. a washer) so that the force of the two jack contact points 157A and 157B are distributed to the scraper support 150A surrounding the rod 107.

Figure 10:
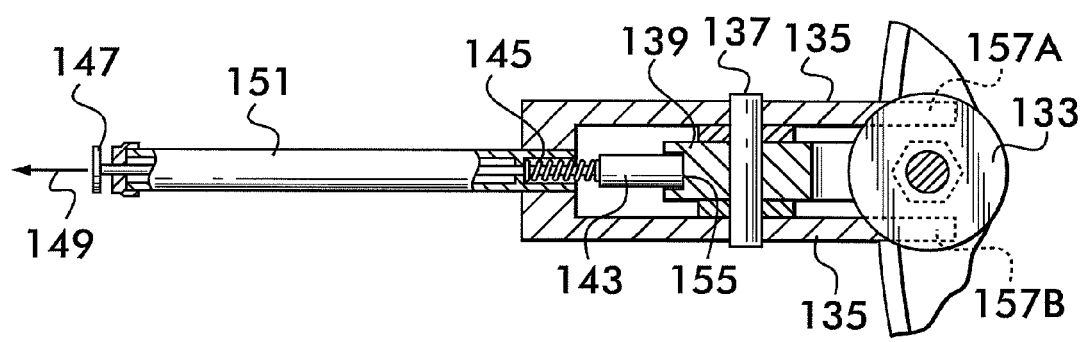
FIG. 10 is a partial cross-sectional top view of a jack used for raising or lowering its respective scraper taken along line 10-10 of FIG. 7.

As shown most clearly in FIG. 10, each jack (only one of which, 188A, is discussed, it being understood that the other jacks 188B and 188C operate similarly) comprises a clevis portion 135 that is journaled 137 to a jack support element 139 having a rounded cam surface 141. A locking element 143 is displaceable along a longitudinal axis of the jack 188A and is biased towards the cam surface 141 by a spring 145. A release lever 147 is directly coupled to the locking element 143. The spring 145 acts to lodge the locking element 143 against the cam surface 141. To move the jack 188A and displace the scraper support 150A, the operator pulls on the 147 in the direction of the arrow 149 (FIG. 10), thereby disengaging the locking element 143 from the cam surface 141 against the bias of the spring 145. A handle 151 of the jack 188A is then displaced in the direction of the arrow 153 (FIG. 7), which displaces the scraper support 150A upward as shown in FIG. 7 to the position shown in phantom, while the locking element 143 rides against the cam. Once the handle 151 is moved to the location of cavity 155 in the jack support element 139, the locking element 143 is forced into the cavity 155 due the bias of the spring 145 and the scraper support 150A is locked in its upward position. The operator can (but does not have to) re-tighten the threaded member 125 to also lock the clamp 119 against the rod 107. At that point, the curved end (which was originally secured under the cover plate 109 at the center of the solid separator 120) of the scraper support 150A can now be displaced away from the center, by pivoting about the post 107, as shown in FIG. 6 in phantom. It should be noted that although the curved end of the scraper support 150A was released from the cover plate 109 earlier, attempting to rotate the scraper support 150A at that point without raising it first, would cause it to impact the inclined portion 27. Raising the other scraper supports 150B and 150C follow the same procedure.

To lower the scraper supports 150A-150C and prepare the solid separator 120 for operation, the reverse procedure is used. With the scraper support (e.g., 150A) elevated, the operator swings the curved end of the scraper support around so that the curved end of the scraper support is positioned generally over the center of the solid separator 120. Next, the operator may need to loosen the threaded member 125 to release the clamp 119 (if the threaded member 125 had been tightened with the scraper in the raised position). Next, the release lever 147 is pulled outward to remove the locking element 143 from the cavity 155 and the handle 151 is permitted to move upward as the locking element 143 rides along the rounded cam surface 141. Once the handle 151 has been displaced to its upper most position (see FIG. 7) and the threaded member 125 re-tightened to lock the clamp 119 against the post 107, the scraper support 150A is now ready to be secured at the center of the solid separator 120. Assuming the other two remaining scraper supports 150B and 150C are also in there lowered positions, the cover plate 109 is slid over the threaded member 157, while passing the alignment pins 115A-115C into their corresponding holes in the second or lock plate 117, and the washer 113 and nut 111 restored. The curved ends of the scraper supports 150A-150C are then moved into alignment with the corresponding recesses in the periphery of the cover plate 109 such that the corresponding posts 72A-72B slip into those recesses (see FIG. 6).

It should be understood that the particulars of the scraper support raising, lowering and securing at the center of the solid separator 120 are by way of example only and that other mechanisms may be used to accomplish the broad concept of the present invention of independently raising, lowering and securing of each of the spiral-shaped scrapers.

While the invention has been described in detail and with reference to specific examples thereof, it will be apparent to one skilled in the art that various changes and modifications can be made therein without departing from the spirit and scope thereof.

What is claimed is:

1. An apparatus for separating debris from a liquid flow, said apparatus comprising:
    a screen for removing debris from a liquid flow which deposits the debris on a top surface of said screen to form a filtered liquid flow;
    a motor/gear assembly for rotating said screen about a vertical axis;
    a plurality of spiral-shaped scrapers suspended closely adjacent said top surface of said screen for displacing the debris deposited on said top surface and toward an upwardly inclined outer edge of said screen when said screen is rotated;
    a plurality of concentric spiral guides positioned on said outer edge of said screen;
    a debris discharge sump positioned adjacent said outer edge of said screen for receiving said displaced debris; and
    an outlet for receiving said filtered liquid flow for recycling the filtered liquid flow.

2. The apparatus of claim 1 wherein each of said spiral-shaped scrapers are positioned over said screen such that debris is driven toward a convex side of said scrapers during screen rotation.

3. The apparatus of claim 2 wherein each of said scrapers has a first end positioned closely adjacent a center location of said screen.

4. The apparatus of claim 3 wherein each of said scrapers has a second end that is disposed over said concentric spiral guides.

5. The apparatus of claim 4 wherein said apparatus comprises a debris plenum located at an outer edge of said screen, said debris plenum comprising an open top for receiving debris that passes over said outer edge of said screen.

6. The apparatus of claim 5 further comprising at least one paddle secured to said screen and disposed within said debris plenum, said at least one paddle displacing any debris within said debris plenum.

7. The apparatus of claim 6 wherein said convex side comprises a stick-resistant material to minimize the amount of deposited debris that may cling to each of said scrapers.

8. The apparatus of claim 7 wherein each of said scrapers comprises a clamp that is secured along a lower edge of said scraper, said clamp including a lower edge that forms an angle with respect to screen.

9. The apparatus of claim 8 wherein said angle is approximately 15°.

10. The apparatus of claim 7 further comprising a respective scraper support having a first end positioned at a center of said apparatus and a second end positioned at an outer edge of said apparatus, each of said scraper supports being pivotally mounted at said second end of said scraper support.

11. The apparatus of claim 10 further comprising a respective jack for each of said scraper supports and wherein each of said jacks independently lifts or lowers said respective scraper support.

12. The apparatus of claim 11 wherein each of said jacks lifts or lowers said respective scraper support at said second end of said scraper support.

13. The apparatus of claim 12 wherein each of said jacks comprises a locking mechanism for releasably securing said respective scraper support at an elevation above said screen.

14. The apparatus of claim 13 wherein each of said scrapers comprises a clamp that is secured along a lower edge of said scraper, said clamp including a lower edge that forms an angle with respect to said screen.

15. The apparatus of claim 14 wherein said angle is approximately 15°.

16. The apparatus of claim 10 wherein said screen comprises a first screen element and a second screen element and wherein the debris is deposited on top of said first screen element.

17. The apparatus of claim 16 wherein said first screen element comprises a metal layer of approximately 14 gauge.

18. The apparatus of claim 17 wherein said second screen element comprises a metal layer of approximately 28 gauge.

19. The apparatus of claim 1 further comprising a scraper support from which said scrapers are suspended and positioned above said screen, said scraper support comprising a plate having a plurality of apertures therein.

20. The apparatus of claim 1 further comprising a collection chamber positioned underneath said screen for receiving said filtered liquid flow, said collection chamber comprising a downwardly-inclined bottom surface.

21. The apparatus of claim 1 wherein each of said scrapers comprises an outer end having a lower edge that is upwardly-inclined to correspond to said unwardly-inclined surface.

22. The apparatus of claim 1 further comprising a level sensor positioned above said screen for detecting the level of contaminated liquid present above said screen, said level sensor being coupled to said motor/gear assembly for controlling the activation of said motor/gear assembly for rotating said screen.

23. A method for separating debris from a contaminated liquid flow containing debris while minimizing the loss of such liquid during separation, said method comprising the steps of:
directing said contaminated flow onto a horizontally-positioned screen having an upwardly inclining outer edge;
suspending a plurality of spiral-shaped scrapers closely-adjacent a top surface of said screen;
rotating said screen about a vertical axis to permit said plurality of spiral-shaped scrapers to displace the debris deposited on said screen and to form a filtered liquid flow that passes through said screen into an outlet for recycling said filtered liquid flow;
providing a plurality of concentric spiral guides on said outer edge; and
collecting said displaced debris into a debris plenum positioned along an outer edge of said screen.

24. The method of claim 23 wherein said step of suspending a plurality of spiral-shaped scrapers closely-adjacent a top surface of said screen comprises suspending said spiral-shaped scrapers over said screen such that debris is driven toward a convex side of said scrapers during screen rotation.

25. The method of claim 24 wherein said step of suspending spiral-shaped scrapers over said screen comprises positioning straight portions of said spiral-shaped scrapers along an outer edge of said screen.

26. The method of claim 23 wherein said spiral-shaped scrapers and said concentric spiral guides cooperate to drive said deposited debris over said outer edge of said screen.

27. The method of claim 26 wherein said step of collecting said displaced debris into a debris plenum comprises positioning an open annular-shaped plenum at said outer edge of said screen.

28. The method of claim 27 wherein said step of collecting said displaced debris into a debris plenum comprises securing at least one paddle within said debris plenum that is coupled to said screen, said at least one paddle displacing said collected debris towards a discharge outlet during screen rotation.

29. The method of claim 28 comprises continuously rotating said screen.

30. The method of claim 28 wherein said step of rotating said screen comprises positioning a liquid level sensor closely-adjacent said screen and causing said screen rotation whenever a predetermined level of contaminated flow is deposited onto said top surface of said screen.

31. The method of claim 28 wherein said step of suspending said plurality of scrapers closely-adjacent said top surface of said screen comprises suspending said plurality of scrapers from a common plate having a plurality of apertures therein.

32. The method of claim 28 said step of suspending said plurality of scrapers closely-adjacent said top surface of said screen comprises suspending each one of said plurality of scrapers from a respective scraper support, each of said scraper supports having a first end positioned at a center of said apparatus and a second end positioned at an outer edge of said apparatus, each of said scraper supports being pivotally mounted at said second end of said scraper support.

33. The method of claim 32 wherein said step of suspending each one of said plurality of scrapers from a respective scraper support comprises integrating a respective jack with each of said scraper supports and wherein each of said jacks independently lifts or lowers said respective scraper support.

34. The method of claim 33 wherein said step of each of said jacks independently lifting or lowering said respective scraper support comprises lifting or lowering said respective scraper supports at said second ends of said scraper supports.

35. The method of claim 34 wherein said step of lifting or lowering said respective scraper supports comprises releasably securing said respective scraper supports at an elevation above said screen.

36. The method of claim 35 further comprising the step of rotating each of said scraper supports away from a center of said screen.

37. The method of claim 32 wherein said step of directing said contaminated flow onto a horizontally-positioned screen comprises providing a first screen element and a second screen element and wherein the debris is deposited on top of said first screen element.

38. The method of claim 37 wherein said first screen element comprises a metal layer of approximately 14 gauge.

39. The method of claim 38 wherein said second screen element comprises a metal layer of approximately 28 gauge.

* * * * *